United States Patent

[11] 3,633,921

[72] Inventor Itsuki Ban
829, Higashi-Oizumimachi, Nerima-ku, Japan

[21] Appl. No. 46,046
[22] Filed June 15, 1970
[45] Patented Jan. 11, 1972

[54] MEANS FOR MOVING MEMBER SUCH AS CARTRIDGE AND LIKE FOR MAGNETIC TAPE CARTRIDGE PLAYER
4 Claims, 2 Drawing Figs.

[52] U.S. Cl. .......... 274/4 B
[51] Int. Cl. .......... G11b 5/68
[50] Field of Search .......... 226/89, 90; 242/198, 55.19 A; 274/4 E, 4 F, 4 B

[56] References Cited

UNITED STATES PATENTS

| | | | |
|---|---|---|---|
| 3,381,910 | 5/1968 | Fundingsland | 242/198 X |
| 2,471,071 | 10/1969 | Lane | 226/89 |
| 3,475,031 | 10/1969 | Kuehnlein | 242/198 X |
| 3,504,916 | 4/1970 | Ban | 274/4 F |

*Primary Examiner*—Allen N. Knowles
*Attorney*—Jacobs and Jacobs

ABSTRACT: Means for moving members such as a cartridge and the like for a magnetic tape cartridge player, comprising a rotary capstan for driving a magnetic tape, a movable lever, a cam wheel rotatably mounted on the movable lever and rotatably driven by abutment against the capstan as the movable lever is moved, bias means for urging the movable lever in the direction that the cam wheel is pressed against the capstan, a locking means for retaining the movable lever in the position where the cam wheel is not pressed against the capstan, and an actuator attached to the movable lever and engageable with members such as the cartridge and the like. In response to disengagement of the locking means from the movable lever, the cam wheel is rotatably driven by the capstan and the movable lever is thereby moved to allow the actuator to move the members.

MEANS FOR MOVING MEMBER SUCH AS CARTRIDGE AND LIKE FOR MAGNETIC TAPE CARTRIDGE PLAYER

BACKGROUND OF THE INVENTION

This invention relates to a magnetic tape cartridge player, and more particularly to means for moving members such as a cartridge and the like.

In a conventional playing apparatus utilizing a magnetic tape cartridge, in order to control the play of the cartridge, the cartridge is moved from a predetermined operative position or a movable deck which carries a capstan for driving the tape and a magnetic head for transduce the tape is moved from the cartridge in the operative position. An electromagnetic plunger has been generally practiced to mechanically move members such as the cartridge or the deck and the like. The electromagnetic plunger to be used to this end is required to be of massive and consume much power since extensive force and big stroke are required to move the members. Furthermore, a space is also a critical problem due to the massive electromagnetic plunger. Such electromagnetic plunger is too expensive for practical use. The electromagnetic plunger requires much current power and thus is not suitable for use in a tape player having a battery as electric power. The use of electromagnetic plunger is not undesirable since it moves the member in impact manner.

The inventor has succeeded in obtaining a simple and inexpensive apparatus by which the members are moved without using of a drive source such as electromagnetic plunger or the like.

SUMMARY OF THE INVENTION

It is a primary object of the invention to provide means for moving members such as cartridge and the like for a magnetic tape cartridge player, wherein the members such as the cartridge and the like are moved by the use of a rotational force for driving the magnetic tape.

Another object of the invention is to provide means for moving members such as cartridge and the like for a magnetic tape cartridge player, wherein a frictional cam wheel is rotatably mounted on a movable lever to which is attached an actuator engageable with the cartridge and the like, the frictional cam wheel being rotatable by abutment against the capstan whereby the movable lever is reciprocated at which time the members are moved by the actuator.

A further object of the invention is to provide means for moving members such as cartridge and the like for a magnetic tape cartridge player, wherein the moving means is retained by a locking means in the position that the cam wheel is not pressed against the capstan and in response to disengagement of the moving lever from the locking member the cam wheel is rotated by abutment against the capstan, the moving lever being reciprocated when the cam wheel is rotated through a revolution and the moving lever being further retained by the locking means to diminish abutment force between the cam wheel and the capstan to automatically stop rotation of the cam wheel.

Yet another object of the invention is to provide means for moving members such as cartridge and the like for a magnetic tape cartridge player, electricity is consumed only when the locking means is disengaged from the moving lever thereby requiring less electricity.

According to the invention, extensive force necessary for moving the members is readily obtained to ensure movement of the members in gentle manner thereby providing mechanically satisfaction.

These and other objects of the invention will be apparent from the following description and accompanying drawing in which:

DESCRIPTION OF THE PREFERRED EMBODIMENTS

Figure 1:
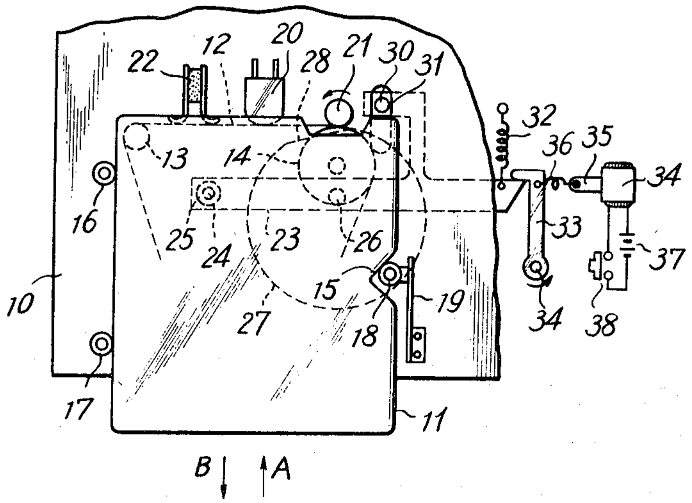
FIG. 1 is a representation schematically showing a magnetic tape player in which means is mounted according to the present invention.

Referring now to the drawing, and in particularly to FIG. 1, the reference numeral 10 designates a horizontal player deck within a housing (not shown) for an endless magnetic tape cartridge player. A was is provided on the deck 10 for an endless magnetic tape cartridge 11 while guide members 16, 17 and 18 are mounted on the deck for holding the way in the operative position. The guide member or retention roller 18 is provided to a leaf spring of which one end is rigidly mounted to the deck 10. The guide member is pressed into a notch 15 on the side of the cartridge 11. Pressure of the retention roller 18 against the inclined wall of the notch 15 in the cartridge provides a forward force for the cartridge to bring the latter into the operative position with respect to a magnetic head 20 and a rotatory capstan 21.

The cartridge 11 comprises a generally rectangular housing which contains therein an endless magnetic tape 12 helically wound in a conventional manner, a tape guide 13, and a pinch roller for driving the tape in cooperation with the capstan. The capstan 21 is rotatably mounted to a suitable bearing beneath the deck 10 and upwardly extends through a hole (not shown) bored through the deck, The capstan 21 is rotatably driven in the direction of the arrow as shown by for instance an electrical motor (not shown) mounted beneath the deck. The capstan 21 is adapted to cooperate with the pinch roller 14 of the cartridge 11 when the cartridge is urged into its operative position. The magnetic head 20 on the deck 10 is adapted to transduce the tape 12 of the cartridge in the operative position. The magnetic head 20 is suitably shifted to the position so as to play a plurality of record-tracks on the tape by means a shifting means not shown as it has no role for the present invention. The shifting means is adapted to move the magnetic head 20 in response to detection of a conductive foil (not shown) as endmark on the tape 12 by an endmark detector 22 provided on the deck.

Figure 2:
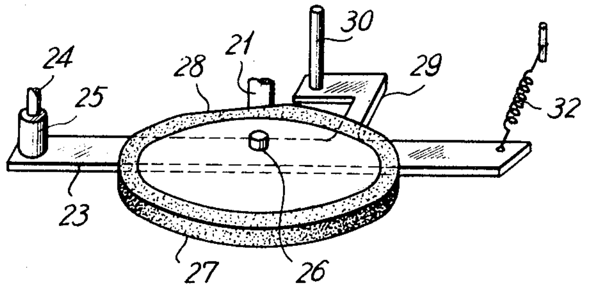
FIG. 2 is a perspective view showing only portion relative to the invention extracted from that shown in FIG. 1.

The detail of the device for moving members such as cartridges and the like will be described by reference to FIGS. 1 and 2.

Means for moving members such as cartridge or the like according to the invention has a movable lever 23 swingably provided at its end to an axis 24 connected to the deck 10 thereunder by a sleeve 25. A rubber covered cam wheel 27 is eccentrically pivoted to a pin 26 connected to the lever 23. The cam wheel 27 is of substantially circular and having a flat minimum eccentric portion 28 at a periphery nearest to the pin 26. The cam wheel 23 is adapted to rotatably driven by abutment against the capstan in the region under the deck in relation to swingable movement of the lever 23 as will be described later. The lever 23 has an arm 29 projecting from the midportion thereof. A pin or actuator 30 connected to the arm 29 upwardly extends through an elongated slot 31 bored through the deck 10. The actuator 30 is adapted to engage members such as cartridge and the like to be moved. In this instance, the actuator 30 is adapted to engage the leading edge of the cartridge 11 in the operative position. The lever 23 is biased by a spring member 32 in the direction that the cam wheel 27 is pressed against the capstan 21, however, movement of the lever 23 by the spring 32 is normally limited by a stopper lever 33 pivoted to a pin 34 connected to the deck 10 thereunder to the position where the cam wheel 27 is not pressed against the capstan 21. The stopper lever 33 is also urged by a spring (not shown) to the position so as to maintain engageable relation with the end of the movable lever 23. The stopper lever 33 is coupled by a spring 37 to a plunger 36 of a solenoid 35 fixed to the deck 10 thereunder and is moved by the solenoid 35 to disengage the lever 23 when the solenoid is energized. The solenoid 35 is connected in series with a power source 38 through a normal opened pushbutton switch 39.

Now the pushbutton switch 39 is operatively depressed to energize the solenoid 35 through the power source 38, the stopper lever 33 is then moved to disengage the movable lever 23. When this lever 23 is slightly and counterclockwise swung by the bias of the spring 32, the minimum eccentric portion 28 of the cam wheel 27 abuts against the capstan 21 to initiate rotation of the cam wheel. During the time that the cam wheel 27 is rotated through a half revolution, the lever 23 is gradually and clockwise swung as the cam wheel 27 is rotated. With swingable movement of the lever 23, the actuator 30 pushes the leading edge of the cartridge 12 to move back the cartridge 12 from the operative position in the direction of the arrow B. So long as the cam wheel 27 is rotated through a half revolution, the cartridge 11 is moved to allow the retention roller 18 to escape from the notch 15. The cartridge 11 is moved back by the actuator 30 from the operative position to keep the pinch roller 14 within the cartridge away from the capstan 21 to thus terminate transportation of the tape in the cartridge to stop the play of the cartridge. The cam wheel 27 is continuously pressed against the capstan by the bias of the spring 23 and is rotated through a half revolution and further rotated. Thereafter, the lever 23 is counterclockwise swung by the bias of the spring 32. The lever 23 is engaged by the stopper lever 33 just before the cam wheel 27 is rotated through a revolution, and is prevented from swinging. Abutment force between the cam wheel 27 and the capstan 21 derived from the spring 32 is diminished when the lever 23 is engaged by the stopper lever 33, and the cam wheel is prevented from rotating after its revolution. When the cam wheel 27 stops its rotation, the cam wheel 27 is positively disconnected with the capstan 21 since the cam wheel 27 has the flat minimum eccentric portion.

The cartridge 11 which has been moved by swingable movement of the lever 23 from the operative position can be readily taken out from the cartridge player in the direction of the arrow B since the retention roller 18 is escaped from the notch 15. In order to play the cartridge 11 again, it is only necessary to push the cartridge in the direction of the arrow A moving it in the operative position.

In illustrative embodiment, the device according to the invention is shown as moving the tape cartridge, however, it is not limited to movement of the cartridge and be able to move members other than the cartridge.

Although the invention has been described with reference to specific embodiment, it is apparent that the invention is not to be limited to the embodiment as illustrated, and, accordingly, changes and variations may be made without departing from the spirit and scope of the invention as defined in the appended claims.

What is claimed is:

1. In a magnetic tape cartridge player having a rotatory capstan, the capstan being adapted to drive a magnetic tape in the cartridge in a predetermined operative position, means for moving members such as cartridge and the like comprising a movable lever; a frictional cam wheel rotatably mounted on said movable deck the cam wheel being adapted to abut against said capstan in response to movement of the movable lever; bias means for normally urging the movable lever in the direction that the cam wheel abuts against said capstan; a locking means for retaining the movable lever in the position the cam wheel is not pressed against the said capstan against the bias of the bias means, said locking means having a movable stopper lever engageable with the movable lever and a shift means for moving the stopper lever to disengage the movable lever; an actuator attached to said moving lever and adapted to have engageable relation with said members, the actuator being engaged by said members and moving the latter when the locking means disengage the moving lever and the cam wheel is pressed against said capstan by the bias of said bias means to allow the cam wheel to rotate by said capstan to thus move the moving lever, said moving lever being reciprocated by one revolution of the cam wheel and returned to the position to engage the stopper lever thereby being prevented from moving.

2. Means for moving members such as cartridge and the like in accordance with claim 1, wherein said frictional cam wheel is a rubber covered wheel of substantially circular and eccentrically pivoted to a pin on said moving lever.

3. Means for moving members such as cartridge and the like in accordance with claim 2, wherein said rubber covered wheel has its periphery in a flat form at a portion nearest to said pin.

4. Means for moving members such as cartridge and the like in accordance with claim 1, wherein said shift means is a solenoid having a plunger connected to said stopper lever, the solenoid being adapted to move the stopper lever to disengage said moving lever when it is energized.

* * * * *

PO-1050
(5/69)

UNITED STATES PATENT OFFICE
CERTIFICATE OF CORRECTION

Patent No. 3,633,921 Dated January 11, 1972

Inventor(s) ITSUKI BAN

It is certified that error appears in the above-identified patent and that said Letters Patent are hereby corrected as shown below:

On the Title Page, after item [45] insert --claims priority, Japan, Japanese Patent Application 1969-46845, June 16, 1969--

Signed and sealed this 30th day of May 1972.

(SEAL)
Attest:

EDWARD M.FLETCHER,JR.
Attesting Officer

ROBERT GOTTSCHALK
Commissioner of Patents